United States Patent [19]

Maddalena

[11] Patent Number: 4,989,312

[45] Date of Patent: Feb. 5, 1991

[54] UNIVERSAL WHEEL PULLER AND LOCK PLATE COMPRESSOR TOOL

[76] Inventor: Kris L. Maddalena, 3544 W. Georgia Ave., Phoenix, Ariz. 85019

[21] Appl. No.: 481,900

[22] Filed: Feb. 20, 1990

[51] Int. Cl.[5] ............................................ B23P 19/04

[52] U.S. Cl. ............................................ 29/259

[58] Field of Search ................. 29/258, 259, 260, 263, 29/269, 266

[56] References Cited

U.S. PATENT DOCUMENTS

| | | | |
|---|---|---|---|
| 4,372,029 | 2/1983 | Shevada | 29/260 |
| 4,771,528 | 9/1988 | Stromberg | 29/259 |
| 4,868,965 | 9/1989 | Drymon | 29/259 |
| 4,908,925 | 3/1990 | Johnson | 29/270 |

*Primary Examiner*—Robert C. Watson

*Attorney, Agent, or Firm*—Richard G. Harrer; Charles E. Cates

[57] ABSTRACT

A multi-purpose tool for both pulling vehicle steering wheels and compressing lock plates of steering columns has a generally H-shaped main frame with two pairs of opposed and substantially parallel sides. A first threaded opening passes entirely through the approximate center of the frame and through a first pair of opposed sides of the frame. A second opening also passes entirely through the approximate center of the frame and through the second pair of opposed sides, this second opening being positioned in the frame at an angle of about 90° to the first threaded opening. Positioned on both sides of the first opening of the frame is a channel which extends through the frame and runs generally parallel to the first threaded opening. On one of the sides of the frame through which the second opening passes, at least one threaded opening is provided on both sides of the second opening. A threaded center bolt is used, one end having a head which is preferably detachable and the other end an internally threaded socket. Additionally, machine bolts of varying sizes are included. When the tool is used as a steering wheel puller, the center bolt is threaded through the first threaded center opening of the frame and a pair of machine bolts is placed in each channel adjacent the first opening of the frame and then each machine bolt is screwed into the threaded openings of the steering wheel. To compress a lock plate, the frame is turned 90° so that the second opening of the frame is in line with the steering shaft. The center bolt is then inserted in the second center opening of the frame so that the internally threaded socket end of the center bolt can be screwed on to the threaded end of the steering shaft.

4 Claims, 2 Drawing Sheets

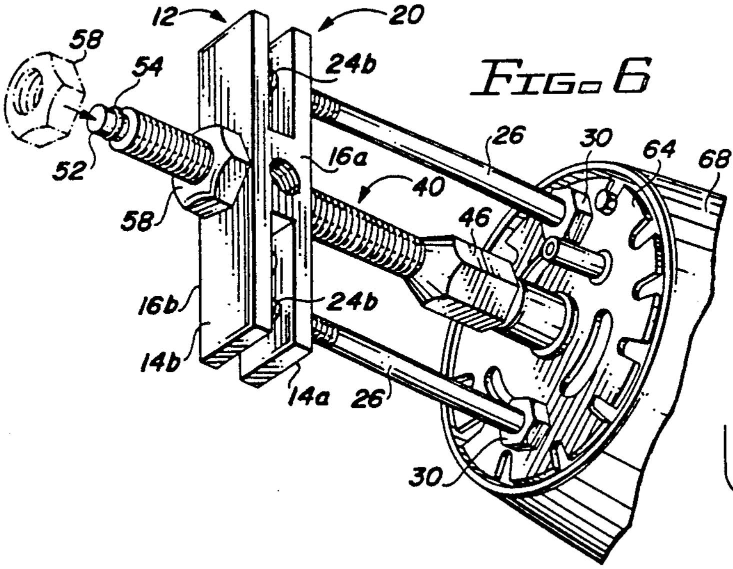
FIG. 6
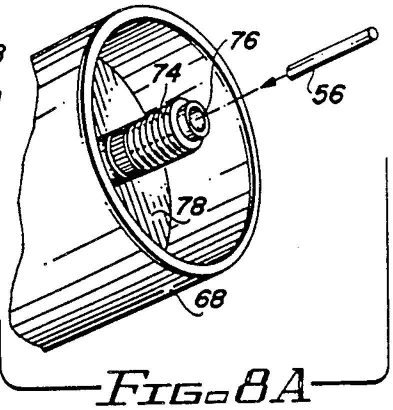
FIG. 8A
FIG. 7
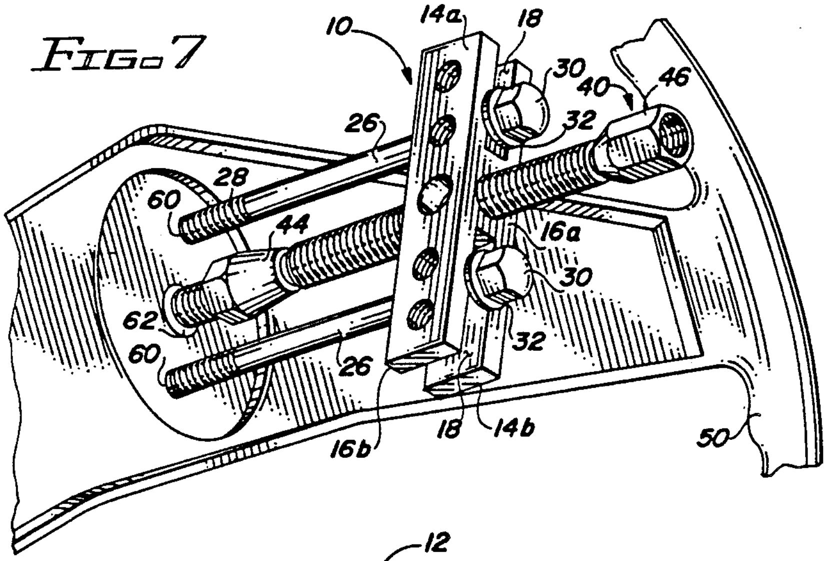
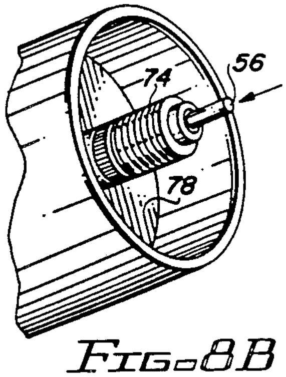
FIG. 8B
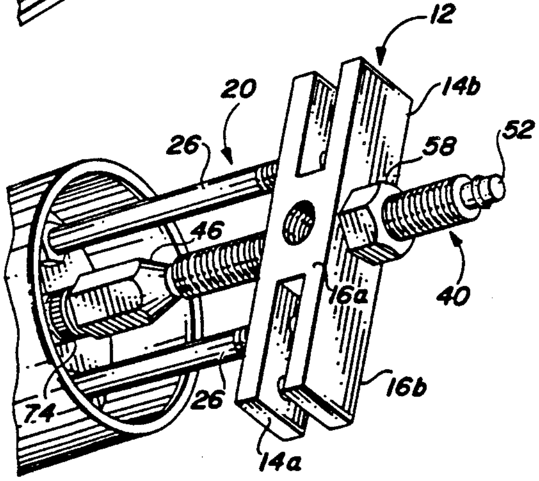
FIG. 8C
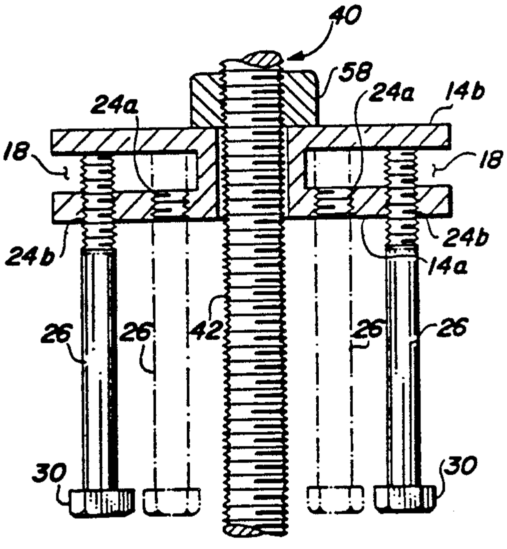
FIG. 9

UNIVERSAL WHEEL PULLER AND LOCK PLATE COMPRESSOR TOOL

This invention relates to a multi-purpose tool for both pulling steering wheels and compressing so-called lock plates of steering columns in vehicles.

BACKGROUND OF THE INVENTION

It is sometimes necessary for locksmiths or mechanics to work on or tear down the steering column of a vehicle to repair or replace lock cylinders or other components contained within the steering column. As an example, locksmiths are frequently called upon to repair or replace damaged ignition locks in automobiles, which in virtually all modern vehicles are located on the steering column. Most ignition locks of vehicles have a two-fold function. Placing a key in the lock and turning it energizes the starter to turn over the engine; this action also "unlocks" the steering wheel so that the vehicle may be directionally controlled.

In order to repair or replace components of the steering column such as the ignition lock, one must first remove the steering wheel and this is done by using a tool called a steering wheel puller. A steering wheel puller is employed to remove the steering wheel from the steering shaft without damage. Without a steering wheel puller, one would not be able to properly remove the steering wheel. The next step in repairing, for example, the ignition lock, is to remove the lock plate in the steering column which is the device that locks up the steering wheel when the key is turned off. This lock plate is held in place in the steering column by a retainer called a snap ring which surrounds the steering shaft. In order to remove the retainer or snap ring, one must first release the pressure put on it by the lock plate through the action of compressing the lock plate in a downward direction. This is typically done with another tool called a lock plate compressor.

There are three basic types of steering columns. One, a standard column which is fixed in position and the steering wheel does not move either up or down or in and out. In more recent years, the tilt steering column has become popular and in such a construction the steering wheel and a portion of the steering column is adjustable in an up and down direction to accommodate the needs of individual drivers. A third type of steering assembly is also used and this is called a tilt/telescopic steering column which not only adjusts in a vertical manner but can also be adjusted in a direction either towards or away from the driver. The first two described columns, that is the standard column and the tilt column, are basically the same when it comes to disassembly and a tool is required to remove the steering wheel and another tool to compress the lock plate. The lock plate in a tilt/telescoping column is of different construction and requires yet another type of tool.

Accordingly, there is a need for a tool which will effectively remove steering wheels and at the same time serve to compress the lock plate on virtually all types of steering columns available in current model vehicles.

BRIEF SUMMARY OF THE INVENTION

I have invented a multi-purpose tool which will not only remove steering wheels but will compress lock plates in the steering columns in most automobiles. The tool comprises a generally rectangular shaped main frame having two pairs of opposed and substantially parallel sides. A first threaded opening passes entirely through the approximate center of the frame and through a first pair of opposed sides of the frame. A second opening also passes entirely through the approximate center of the frame and through the second pair of opposed sides. Thus, this second opening is positioned in the frame at an angle of about ninety degrees to the first threaded opening. Positioned on both sides of the first opening of the frame is a channel which extends through the frame and runs generally parallel to the first threaded opening. On one of the sides of the frame through which the second opening passes, at least one threaded opening is provided on both sides of the second opening, such threaded openings extending a distance into the frame.

A threaded center bolt is provided, one end of which is provided with a swivel head which is preferably detachable and the other end an internally threaded socket. Additionally, machine bolts of varying sizes are included for use with the H-shaped main frame.

When the tool is used as a steering wheel puller, the horn pad and nut which secures the steering wheel to the steering shaft of the vehicle are first removed. Thereafter, the center bolt is threaded through the first threaded center opening of the frame and this is easily accomplished by first removing the swivel head. After the center bolt has been threaded through this threaded center opening, the swivel head is again placed on the end of the center bolt. The area of the steering wheel which surrounds the steering shaft is customarily provided with two threaded openings. A pair of bolts which are appropriately threaded to fit the threaded openings in the steering wheel are selected and a bolt is placed in each channel adjacent the first opening of the frame and then each bolt is screwed into the threaded openings of the steering wheel. Thereafter, the center bolt is screwed in a direction toward the steering shaft until the swivel head contacts the end of the steering shaft. Continued screwing of the center bolt will cause the frame to ride up the threads of the center bolt moving in a direction away from the steering shaft and thereby causing the steering wheel to be pulled away from the steering shaft through the use of leverage.

If it is necessary to get at the steering column mounted ignition lock or other components within the steering column, once the steering wheel has been removed, the lock plate in the steering column is visible. The lock plate is held in place by a retainer called a snap ring. In order to remove this snap ring, one must first compress the lock plate in a downward direction so as to release the tension on the snap ring. To do this, the swivel head is removed from the center bolt and the center bolt is removed from the frame. Then the frame is turned 90° so that the second opening of the frame is in line with the steering shaft of the steering column. The center bolt is then inserted in the second center opening of the frame in a manner such that the internally threaded socket end of the center bolt can be screwed on to the threaded end of the steering shaft. Additionally, a bolt is screwed into each of the threaded openings which are on each side of the second center opening of the frame. Thus the heads of each of the bolts extend downwardly and make contact with the surface of the lock plate in the steering column. A nut is then screwed onto the center bolt after the center bolt is placed through the second opening of the frame. As the nut is tightened on the center bolt the frame moves in a direction toward the lock plate. The side bolts, whose heads bear against the face of the lock plate of course also move against the lock plate causing the lock plate itself to be compressed downward and which allows for easy removal of the snap ring or retainer.

In situations where the steering column is of the tilt and telescoping type, the same procedure as previously described is used for both removing the steering wheel and for compressing the lock plate except that in the case of the tilt and telescope type, a short pin is used which pin is placed in a cavity at the end of the steering shaft. Thereafter, the internally threaded socket of the center bolt is threaded on the steering shaft and the same procedure as described above is followed to compress the lock plate.

BRIEF DESCRIPTION OF THE DRAWINGS

FIG. 6 is a perspective view of the multi-purpose tool attached to a steering column to compress the lock plate;

FIG. 7 is a perspective view showing the multi-purpose tool being used to remove a steering wheel;

FIG. 8A is a part perspective view of the steering shaft on a vehicle equipped with a tilt and telescoping steering wheel;

FIG. 8B is a part perspective view of the steering shaft of a vehicle equipped with a tilt and telescoping steering wheel showing a pin inserted in the center of the steering shaft;

FIG. 8C is perspective view showing compression of the lock plate in a vehicle equipped with a tilt and telescoping steering wheel; and FIG. 9 is a side sectional view of the multi-purpose tool when used as a lock plate compressing tool.

DETAILED DESCRIPTION OF THE PREFERRED EMBODIMENTS

Figure 1:
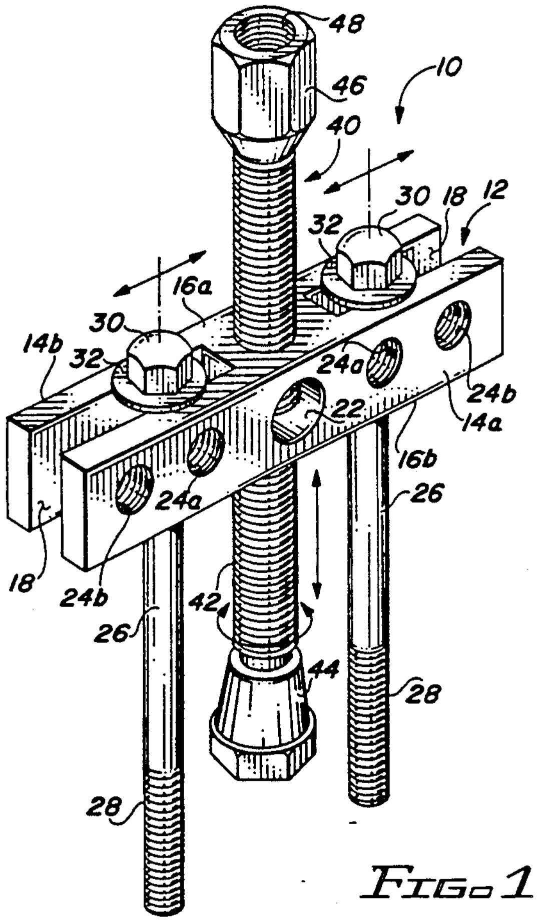
FIG. 1 is a perspective view of the multi-purpose tool for use as a steering wheel puller.

FIG. 1 is a perspective view of one embodiment of the multi-purpose tool, which in the configuration shown generally at 10 is used to pull the steering wheel from the steering column of a vehicle. As shown the tool includes a generally rectangular shaped main frame designated generally as 12, which frame has a first pair of opposed and generally parallel sides 14*a* and 14*b* and a second pair of opposed and generally parallel sides 16*a* and 16*b*. A first threaded opening 34 passes entirely through the approximate center of frame 12 and extends through sides 16*a* and 16*b*. A second opening 22 also passes entirely through the approximate center of frame 12 and extends through sides 14*a* and 14*b*. Thus, second opening 22 is positioned in the frame at an angle of about 90° to threaded opening 34. As shown, opening 22 is not threaded. A channel 18 is positioned on both sides of first opening 34 and passes entirely through the frame and extends through sides 16*a* and 16*b*. Thus each of the channels run generally parallel to threaded opening 34. In a most preferred form, channels 18 extend to each end of the frame and, as shown in FIG. 1, gives the frame an H-shaped appearance when viewing sides 16*a* or 16*b* of the frame. Although preferred, it is not necessary that channel 18 extend all the way to the ends of frame 12 as shown. Side 14*a* of frame 12 is provided with at least one and preferably two threaded openings 24*a* and 24*b* on each side of opening 22. Openings 24*a* and 24*b* extend a distance into the frame and, in the embodiment shown, extend into channel 18. The tool of FIG. 1 also includes a threaded center bolt designated generally as 40 and a pair of side bolts 26.

Figure 3:
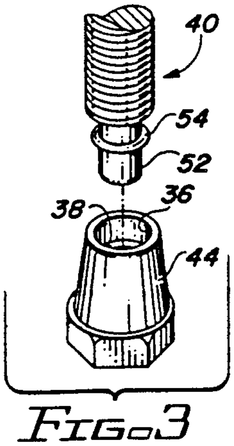
FIG. 3 is a part-perspective view of the center bolt showing the detachable swivel head.
Figure 4:
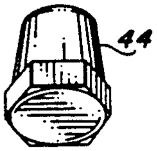
FIG. 4 is a perspective view of the detachable swivel head.

Center bolt 40 is provided with threads 42 substantially throughout its length and, as shown in FIG. 1, has been screwed through threaded opening 34. Center bolt 40 is provided at one end thereof with a removable swivel head 44. As shown in FIGS. 3 and 4, a convenient way to mount head 44 to center bolt 40 is to machine one end of center bolt 40 somewhat to provide a non-threaded end 52 of smaller diameter than the balance of the center bolt, and then provide a groove about the circumference of end 52 of center bolt 40 to accommodate O-ring 54. Head 44 is provided with cavity 36 with a circumferential groove 38. Thus, when end 52 is inserted into cavity 36 of head 44, O-ring 54 will engage groove 38 in cavity 36 and thus engage the head on the center bolt. Additionally, the head will rotate or swivel about the end of the center bolt. The opposite end of center bolt 40 is provided with a hexagonal socket 46 having internal threads 48.

As shown in FIG. 1, a side bolt 26 is positioned in each of channels 18. Each bolt 26 has head 30, washer 32 and a threaded end 28. Bolts 26 are rather loosely supported in each channel by means of head 30 and/or washer 32 and can move laterally within each channel.

To use tool 10 as a steering wheel puller, the horn pad and nut which secures the steering wheel to the steering shaft of the vehicle are first removed. Thereafter, center bolt 40 is threaded through the threaded opening 34 of the H-frame and this is easily accomplished by first removing swivel head 44. After the center bolt has been threaded through the threaded center opening, head 44 is again placed on the end of the center bolt and secured to the end of the center bolt by means of O-ring 54 engaging groove 38. The area of the steering wheel which is adjacent the steering shaft is customarily provided with two threaded openings. As shown in FIG. 7, the swivel head 44 of center bolt 40 has been placed against the end of steering shaft 62 and each of the side bolts 26 has been screwed into openings 60 of the steering wheel. Thereafter, center bolt 40 is screwed in a direction toward the steering shaft and this may be easily accomplished by using a wrench on hexagonal socket 46 until head 44 contacts the end of the steering shaft. Continued screwing on the center bolt 40 will cause the frame to ride up the threads of the center bolt moving in a direction away from the steering shaft. This causes frame 12 to exert a upward force on bolts 26 thereby causing the steering wheel to be pulled away from the steering shaft through the use of leverage.

Figure 2:
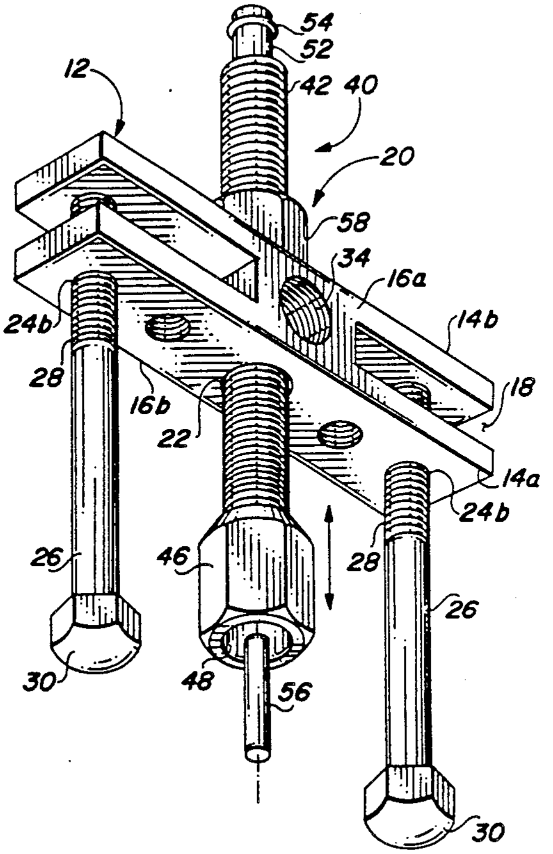
FIG. 2 is a perspective view of the multi-purpose tool for use as a lock plate compressor.

FIG. 2 is a perspective of the tool shown generally as 20 set up for use in compressing lock plates and the tool includes virtually all of the components of the tool of FIG. 1. As shown in FIG. 2 the frame 12 is of the very same construction as shown in FIG. 1 but when used to compress lock plates, the frame in effect is turned 90 degrees from its position as shown in FIG. 1 and the center bolt 40 is inserted through non-threaded opening 22. It will also be see that the position of center bolt 40 has been reversed from that shown in FIG. 1. Specifically, head 44 has been removed from center bolt 40 and the center bolt is placed into the non-threaded opening 22 in such a manner that the hexagonal socket 46 is in a downward position. It will also be observed that side bolts 26 no longer reside in channels 18 but have been threaded into openings 24*b* in side 14*a* of the frame with the heads 30 of bolts 26 pointing downward. A nut 58 has been screwed onto center bolt 40 and keeps the bolt from merely dropping through opening 22. It will also be seen that a pin 56 is shown in connection with hexagonal socket 46 and this pin is used in conjunction with compression of lock plates in vehicles equipped with a tilt and telescoping steering wheel, as will be later explained.

Figure 5:
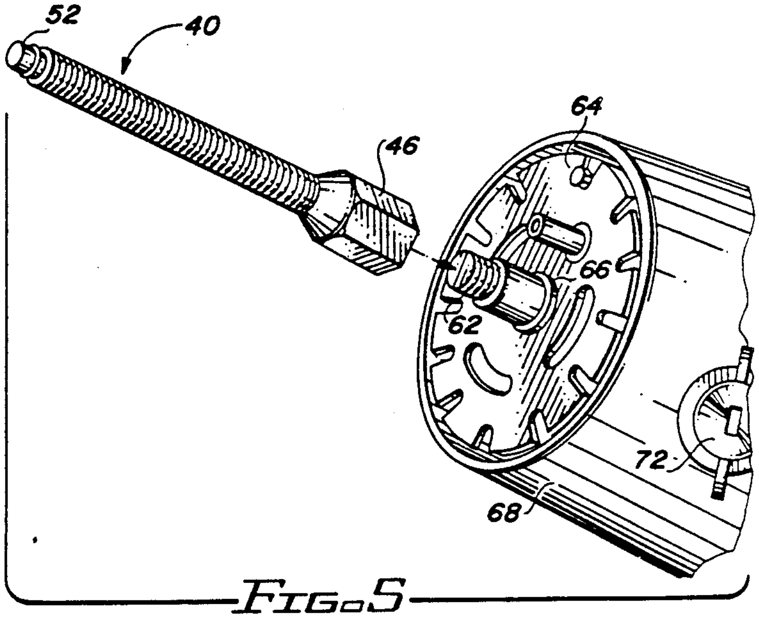
FIG. 5 is a part perspective view showing the internally threaded socket of the center bolt about to be threaded onto a steering shaft.

If it is necessary to get at the steering column mounted ignition lock assembly, for example, once the steering wheel has been removed, the lock plate in the steering column is visible. FIG. 5 shows a partial view of steering column 68 having ignition lock assembly 72 mounted therein. Surrounding steering shaft 62 is lock plate 64 which is held in place by snap ring 66. To compress the lock plate to facilitate removal of the snap ring, the hexagon socket 46 of center bolt 40 is screwed onto the threaded end of steering shaft 62 as shown in FIG. 5. Thereafter, and as best shown in FIG. 6, frame 12, with side bolts 26 threaded into threaded openings 24*b* of side member 14*a*, is placed over the center bolt 40 in such a manner that the center bolt passes through non-threaded opening 22 with the heads 30 of the side bolts being placed on the surface of lock plate 64. Then, nut 58 is screwed onto center bolt 40. As nut 58 is tightened on the center bolt, frame 12 moves in a direction toward the lock plate causing the heads 30 of side bolts 26 to engage the lock plate causing the lock plate to be compressed in a downward direction. This permits the easy removal of the snap ring 66, followed by removal of the lock plate itself giving access to the ignition lock assembly. As best shown in FIG. 9, when the side bolts 26 are used to compress the lock plate 64 or 78, the side bolts may be screwed into either set of threaded openings 24*a* or 24*b* of side member 14*a*. The purpose of having multiple threaded openings in side member 14*a* is to allow for adjustment of the side bolts. For example, if there is excessive tension on the lock plate by the lock plate spring, it may be easier to compress the lock plate by placing the side bolts in openings 24*a* of side member 14*a* which then places the side bolts closer to the steering shaft 62 or 74.

In the case where the steering wheel is of the tilt and telescoping type, the basic multi-purpose tool as previously described is again used for both removing the steering wheel and compressing the lock plate. However with this type of steering column, a pin 56 is used in connection with the tool shown in FIG. 2 in the procedure to compress the lock plate. In FIG. 8A, steering column 68 is shown with a steering wheel shaft 74 which is unique to vehicles employing the tilt and telescoping type steering wheel. At the exposed end of steering wheel shaft 74 is an internally threaded cavity 76 which is about ¾ inch deep. At the base of the cavity there are means for locking the steering shaft or preventing it from telescoping. Such means (not shown) include a rod connected to a piece of tapered steel, which means are positioned within a cylindrical housing surrounding the steering shaft. Pushing down on the rod causes the tapered steel piece to wedge tightly against the interior of the cylindrical housing thereby locking the steering shaft in place. Thus, pin 56 is first placed into cavity 76. Thereafter, the tool as shown generally in FIG. 2 is employed in the same manner as previously described with respect to the lock plates of other types of steering columns. As depicted in FIG. 8B, after the hexagonal socket 46 of center bolt 40 has been threaded onto shaft 74, and the tool set up as shown in FIGS. 2 and 8C, threading of the hexagonal socket 46 onto shaft 74 causes pin 56 to be depressed into cavity 76 of the steering shaft. Pin 56 contacts the internally positioned rod and pushes the rod in a downward direction locking the steering shaft in place. Thereafter, as nut 58 is tightened on the center bolt, frame 12 moves in a direction toward the lock plate 78 causing the heads 30 of side bolts 26 to engage the lock plate causing it to be compressed, allowing removal of the retainer.

What is claimed is:

1. A tool for pulling steering wheels and compressing lock plates of steering columns in vehicles provided with a steering shaft comprising a frame, said frame having: two pairs of opposed sides, a first threaded opening extending through the approximate center of said frame and between a first pair of opposed sides thereof, a second opening extending through the approximate center of said frame and between a second pair of opposed sides thereof, a channel positioned on both sides of said first opening and extending through said frame and generally parallel to said first opening, third and fourth openings positioned on each side of said second opening and extending a distance into said frame; a threaded center bolt having a head at one end thereof and a threaded socket at the other end thereof, said center bolt being sized such that it may be screwed into and through said first opening and may pass without substantial restriction through said second opening; and a pair of side bolts each having a head end and a threaded end and loosely supportable in each channel by means of said head end; and wherein when said tool is used to pull steering wheels said center bolt is screwed into said first opening of said frame, one of said side bolts is placed in each of said channels and the tool is aligned with said steering shaft in a manner such that the head of said center bolt can contact the end of said steering shaft, and the threaded end of said side bolts can be secured into openings in said steering wheel; and when said tool is used to compress a lock plate, said center bolt is positioned in said second opening of said frame with a nut secured to an end thereof, one of said side bolts is secured into each of said third and fourth openings and the tool is aligned with the steering shaft in a manner such that the internally threaded socket of said center bolt can be secured on the end of said steering shaft and the head end of said side bolts can contact the surface of the lock plate.

2. The tool of claim 1 which further includes a pin when said tool is used to compress lock plates in vehicles equipped with a tilt and telescoping steering wheel, one end of said pin being placed in a cavity at the end of said steering shaft with the other end of said pin being placed in said center bolt socket.

3. The tool of claim 1 wherein said channel extends to an end of said frame.

4. The tool of claim 1 wherein said head swivels about the end of said center bolt and is detachable.

* * * * *